United States Patent Office 3,474,221
Patented Oct. 21, 1969

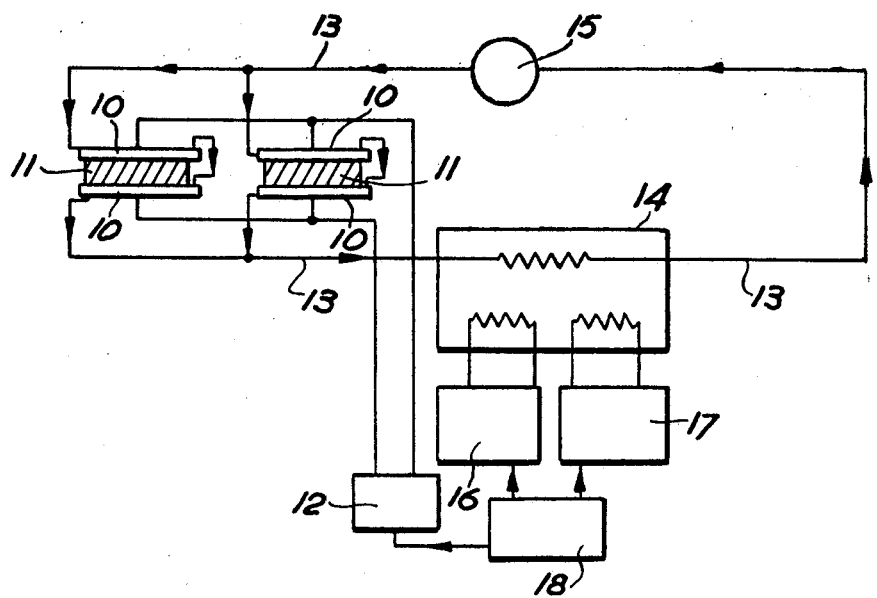

3,474,221
THAWING OF FROZEN BLOCKS
Alfred C. Jason, Aberdeen, Scotland, assignor to The Minister of Technology, a corporation sole
Filed June 30, 1967, Ser. No. 650,545
Int. Cl. H05b 11/00
U.S. Cl. 219—200
4 Claims

ABSTRACT OF THE DISCLOSURE

A method and apparatus for overcoming the problem of low conductivity of frozen blocks which are to be thawed by electric resistance heating by using the heating electrodes as heat exchangers to raise the block temperature to a level at which efficient resistance heating can commence without risk of damage to frozen material, such as fish, in the block.

---

The present invention relates to improved methods and apparatus for thawing frozen blocks such, for example as blocks of frozen fish.

In thawing frozen blocks by resistance heating with the, or each, block contacted on opposite faces by electrodes between which an electrical current is passed through the block, difficulties arise due to localised thawing producing relatively low resistance paths through the block which have the effect of concentrating the current, and thus the heating effect, into relatively small areas instead of producing the desirable uniform distribution of current which would produce the most efficient thawing action. Such concentrations also introduced the risk of damage due to local over heating of material, such as fish, in the block.

The present invention seeks to overcome these difficulties by utilising the electrodes to control thawing at the face of the block in such a way as to minimize the risk of such low resistance paths being set up. Preferably such control is effected by means of a heat exchange medium and, in accordance with the invention there is provided a method of thawing frozen blocks by contacting opposite surfaces of a frozen block by plate electrodes and passing an electrical current through the material of the block between the electrodes wherein a heat exchange medium is circulated so as to contact the electrodes and maintain the electrode surfaces which contact the block below the temperature at which localised thermal damage would otherwise occur during the passage of electrical current through the block.

Preferably the improved method of the invention is combined with the step of heating the electrodes before current is passed between them to reduced the resistance of the block to such current in preparation for its application. Thus, in the latter case, the electrodes are subjected to heating and then to cooling, with the application of current to provide resistance heating of the block commenced between the heating and cooling steps or at such other time in relation thereto as may be desirable.

In a preferred form of apparatus for carrying out the invention the electrodes are of hollow construction and their interior spaces are connected by conduits to a source of heat exchange medium, the conduit system including a circulating pump for the medium and the source being regulable to heat or cool the electrodes.

A diagrammatic representation of such apparatus is shown in the accompanying drawing wherein by way of example two pairs of hollow electrode plates 10 having frozen blocks of fish 11 between them are electrically connected to a heating current source 12 of which the voltage is variable, and are also connected by a conduit system 13 to a heat exchanger 14 through a circulating pump 15. The heat exchanger 14 has two input circuits, one including a heating source 16 and the other including a refrigerating source 17 and the operation of the two sources 16 and 17, and that of the source 12, is controlled by a timing arrangement 18.

The sequence of operation of the apparatus shown is that initially the heating source 16 alone is brought into operation and the electrodes 10 are heated for a period known to be sufficient to reduce the resistance of the blocks 11 to current flow to a desired level. Then the timing arrangement shuts off the source 16 and causes the refrigerating source 17 to operate and also causes the source 12 to operate. Thus as the electrical heating current from source 12 is passed through the blocks 11 the faces of these blocks are cooled by the electrodes which are now supplied with refrigerated heat exchange medium from the heat exchanger 14. Localised surface melting of the blocks is thus prevented and the blocks are thawed uniformly.

I claim:
1. Apparatus for thawing frozen blocks comprising a pair of spaced hollow electrodes, means for applying a voltage across said electrodes, a first source of heated heat exchange medium, a second source of cooled heat exchange medium, conduit means arranged for circulating heat exchange medium through the hollow interiors of said electrodes and means for selectively connecting said first and second sources of heat exchange medium to said conduit means.

2. Apparatus for thawing frozen blocks comprising a pair of spaced hollow electrodes, means for applying a voltage across said electrodes, conduit means arranged for circulating heat exchange medium through the hollow interiors of said electrodes and means for controlling the supply of heat exchange medium to said conduit means, said conduit means including a heat exchanger and a pump arranged to circulate a heat exchange medium through the interiors of said electrodes and through said heat exchanger, and said heat exchanger has a first input circuit including a heating source and a second input circuit including a refrigerating source.

3. Apparatus as claimed in claim 2 including timing means arranged to control the operation of said heating and refrigerating sources.

4. Apparatus as claimed in claim 3 wherein said timing means is arranged to control the application of said voltage to said electrodes.

References Cited

UNITED STATES PATENTS

| 2,325,652 | 8/1943  | Bierwirth | 34—1     |
| 2,423,902 | 7/1947  | Peterson  | 34—1     |
| 2,428,615 | 10/1947 | Brown     | 34—1     |
| 2,488,164 | 11/1949 | Bowman    | 99—107   |
| 2,491,687 | 12/1949 | Nutt      | 107—54   |
| 3,181,452 | 5/1965  | Zaldener  | 99—358 X |

FOREIGN PATENTS

| 124,135 | 4/1947 | Australia.     |
| 351,170 | 6/1931 | Great Britain. |

JOSEPH V. TRUHE, Primary Examiner
C. L. ALBRITTON, Assistant Examiner

U.S. Cl. X.R.
99—234, 358; 165—30